UNITED STATES PATENT OFFICE.

EMIL FISCHER, OF BERLIN, GERMANY.

CHLORO-THEOPHYLLIN AND PROCESS OF PREPARING IT.

SPECIFICATION forming part of Letters Patent No. 559,347, dated April 28, 1896.

Application filed September 23, 1895. Serial No. 563,429. (No specimens.)

*To all whom it may concern:*

Be it known that I, EMIL FISCHER, a citizen of Germany, residing at Berlin, Germany, have invented a certain new and useful Compound Chloro-Theophyllin and Process of Preparing the Same; and I do hereby declare the following to be a full, clear, and exact description of the invention, such as will enable others skilled in the art to which it appertains to make and use the same.

This invention relates to the manufacture of derivatives of theophyllin; and it consists in the new compound chloro-theophyllin and in the process of obtaining the same and in such further steps and features, all as will be hereinafter described, and pointed out in the claims.

In carrying out my process I employ dimethyl-uric acid—that is to say, uric acid which contains two methyl radicals in the alloxan group and which has the following structural formula:

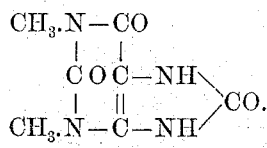

This compound was first obtained by myself and Lorenz Ach by the action of dehydrating agents upon dimethyl-pseudo-uric acid. In order to obtain the chloro-theophyllin, I treat this dimethyl-uric acid in a suitable manner with pentachlorid of phosphorus, together with a suitable solvent, preferably oxychlorid of phosphorus. The reaction taking place under this treatment is expressed in the equation:

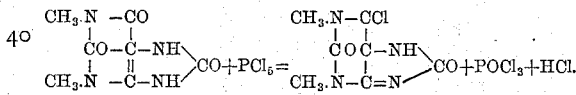

I consider the following the best manner of carrying my invention into effect: The dimethyl-uric acid is heated to about 150° centigrade in a closed vessel, together with the double quantity of phosphorous pentachlorid and four times its quantity of phosphorous oxychlorid, and kept at this temperature for one hour or thereabout. The greatest portion of the dimethyl-uric acid is thereby brought into solution. Soon thereafter the newly-formed theophyllin begins to crystallize out. After retaining the mixture at the above heat for about from two to three hours the reaction is completed. After cooling, the crystals are separated from the mother liquor and purified by recrystallizing out of alcohol. This new body—the chloro-theophyllin—melts with decomposition at about 300° centigrade. It is readily soluble in alcohol, more sparingly soluble in acetone, and very slightly soluble in chloroform. When crystallized from acetone, chloro-theophyllin forms fine needles, mostly united in bundles. It is only slightly soluble in water, requiring more than one hundred and fifty parts of boiling water for solution. In hot mineral acids it is much more soluble.

This new compound itself possesses considerable acid properties, its aqueous solution having an acid reaction. Moreover, it is readily soluble in dilute alkalies, including ammonia.

The sodium salt of this compound is precipitated from an aqueous solution of the same by soda-lye and in the form of fine white needles. By continued heating with alkalies in excess chloro-theophyllin is completely destroyed. By chlorin water it is converted into dimethyl-alloxan, and in consequence gives rise to the well-known reaction of xanthin and its derivatives.

This chlorin derivative of theophyllin possesses the following valuable properties: The physiological action of it on the organism is the same as that of caffein and theobromin. Doses 0.5 to 1.0 grain.

Its formula is:

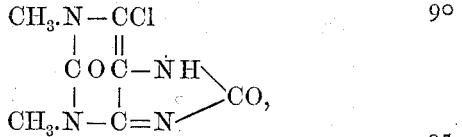

or $C_5H(CH_3)_2ClN_4O_2$.

What I claim, and desire to secure by Letters Patent, is—

1. The process which consists in heating dimethyl-uric acid with a suitable solvent and phosphorous pentachlorid, substantially as set forth.

2. The process which consists in heating dimethyl-uric acid together with phosphorous pentachlorid and phosphorous oxychlorid, substantially as set forth.

3. The process which consists in heating one part dimethyl-uric acid together with two parts phosphorous pentachlorid and four parts phosphorous oxychlorid to, and maintaining the same at, about 150°, centigrade, substantially as set forth.

4. The process which consists in heating one part dimethyl-uric acid together with two parts phosphorous pentachlorid and four parts phosphorous oxychlorid to about 150°, centigrade, and maintaining this temperature for several hours, and then cooling and separating the resulting crystals from the mother liquor, substantially as set forth.

5. As a new compound chloro-theophyllin, having the formula above stated, whose melting-point is about 300°, centigrade, and which is readily soluble in hot alcohol, less so in acetone and sparingly in chloroform and which possesses acid properties.

In testimony whereof I affix my signature in presence of two witnesses.

EMIL FISCHER.

Witnesses:
OSCAR GUNNERLING,
P. REHLÄNDER.